United States Patent [19]

Nagano

[11] Patent Number: 4,546,858
[45] Date of Patent: Oct. 15, 1985

[54] BICYCLE BRAKE HAVING AN IMPROVED ADJUSTMENT MECHANISM FOR ADJUSTING THE POSITION OF A BRAKE SHOE RELATIVE TO A WHEEL RIM

[75] Inventor: Masashi Nagano, Izumi, Japan

[73] Assignee: Shimano Industrial Company Limited, Osaka, Japan

[21] Appl. No.: 548,085

[22] Filed: Nov. 2, 1983

[30] Foreign Application Priority Data

Nov. 6, 1982 [JP] Japan .......................... 57-168562[U]
Nov. 6, 1982 [JP] Japan .......................... 57-168563[U]
Jul. 6, 1983 [JP] Japan .......................... 58-105658[U]

[51] Int. Cl.[4] ............................................... B62L 1/14
[52] U.S. Cl. ........................... 188/24.19; 188/24.21; 188/24.22; 403/4; 403/405.1
[58] Field of Search ............... 188/2 D, 24.11, 24.12, 188/24.13, 24.14, 24.15, 24.19, 24.21, 24.22, 26, 220.6, 221.1, 234; 403/4, 405, 408, 409, DIG. 8

[56] References Cited

U.S. PATENT DOCUMENTS 4,051,924 10/1977 Yoshigai ........................... 188/24.12

FOREIGN PATENT DOCUMENTS 842311  6/1939  France ........................... 188/24.21
848770 11/1939  France ........................... 188/24.19
55-47740 11/1980 Japan .
897018  5/1962  United Kingdom ............ 188/234
2088976 6/1982  United Kingdom ............ 188/24.19

Primary Examiner—Bruce H. Stoner, Jr.
Assistant Examiner—Richard R. Diefendorf
Attorney, Agent, or Firm—Stevens, Davis, Miller & Mosher

[57] ABSTRACT

An improvement in a bicycle brake in which arms are swingably supported to lever shafts at bases fixed to the bicycle frame and in which brake shoes having mounting pins are fixed to the arms through fixing bolts and nuts respectively. Each adjusting member has a pair of inner surfaces parallel to the outside surface of the shoe mounting portion of the associated arm and a pair of outer surfaces inclined with respect to the outside surface of the shoe mounting portion of the associated arm and parallel to each other. A separate adjusting member is supported rotatably with respect to each of the arms so that the vertical and rotational positions of the brake shoes are adjustable by rotations of the adjusting members respectively.

8 Claims, 7 Drawing Figures

BICYCLE BRAKE HAVING AN IMPROVED ADJUSTMENT MECHANISM FOR ADJUSTING THE POSITION OF A BRAKE SHOE RELATIVE TO A WHEEL RIM

FIELD OF THE INVENTION

This invention relates to a cantilever brake for a bicycle, and more particularly to an improvement in a cantilever brake wherein the cantilever is swingably supported to a base fixed to the bicycle frame, a headed fixing bolt for a brake shoe is mounted to the cantilever, a mounting pin is inserted into the head of the bolt, and a nut screwable with the bolt is tightened so that the shoe is fixed to the cantilever.

BACKGROUND OF THE INVENTION

Japanese Utility Model Publication No. Sho 55-47,740 discloses a conventional brake in which a tilted washer having non-parallel sides is interposed between the cantilever and the mounting pin for the shoe inserted into the fixing bolt supported to the lever, with the fixing bolt being inserted through the washer and cantilever and being tightened by a nut. The nut is loosened to turn the washer to thereby adjust the position of the shoe with respect to the cantilever.

Since the washer is turned to tilt the fixing bolt at the nut mounting end with respect to the cantilever, the cantilever surface opposite to the nut should be made spherical and also a washer and a nut to be applied to the outer surface of the cantilever should also be spherical.

As a result, workability deteriorates and it is difficult to machine the contact surfaces of the cantilever, washer and nut to closely approximate a sphere so that these members are in close contact with each other, with the result that a problem is created in that the tightening function of the nut is decreased. In order to solve this problem, when the washer and nut are intended to have a large contact area, the spherical portions of the cantilever must be made relatively thin and thus weak in strength. Hence, the cantilever is required to be large-sized to provide the necessary thickness, with the shoe spaced relatively far apart from the base in order to increase the amount of deflection at the portion between the base and the shoe; therefore, this latter portion should be strong and large in size. This creates a problem in that the brake becomes larger in external size and weight and expensive to produce.

SUMMARY OF THE INVENTION

An object of the invention is to provide a cantilever brake for a bicycle, in which it is easy to machine parts as a whole without the need for precise machining of the contact surfaces of the various parts, such as nuts, for fixing bolts and washers. It is also an object to provide such a brake which fully realizes the tightening function of a nut even with small-sized parts, and which enables adjustment of the position of the brake shoe with respect to the cantilever. In other words, the position of the shoe with respect to the bicycle wheel is adjustable simply, exactly, and over a wide range.

This invention is characterized in that the brake has an adjusting means comprising a pair of inner surfaces parallel to both outside surfaces of a shoe mounting portion at the cantilever and a pair of outer surfaces inclined with respect to the outside surfaces and parallel to each other and adjusting members having insertion bores for the bolts perpendicular to the outside surfaces and being supported rotatably to the cantilever.

The adjusting member of the invention constituting the adjusting means constructed as described above can accomplish adjustment of the position of the brake shoe with respect to the wheel rim without the necessity of machining spherical contact surfaces between the parts, such as the heads of fixing bolts or nuts in contact with the outer surfaces of the adjusting member. Thus, the parts as a whole are easy to machine and need not be large-sized in order to fully realize the nut tightening function, thus attaining the aforesaid object of the invention.

In addition, the adjusting means of the invention alternatively may comprise two adjusting members rather than a single one.

The above and further objects of the invention will be more fully apparent from the following description when considered in conjunction with the accompanying drawings.

DETAILED DESCRIPTION OF THE INVENTION

Figure 1:
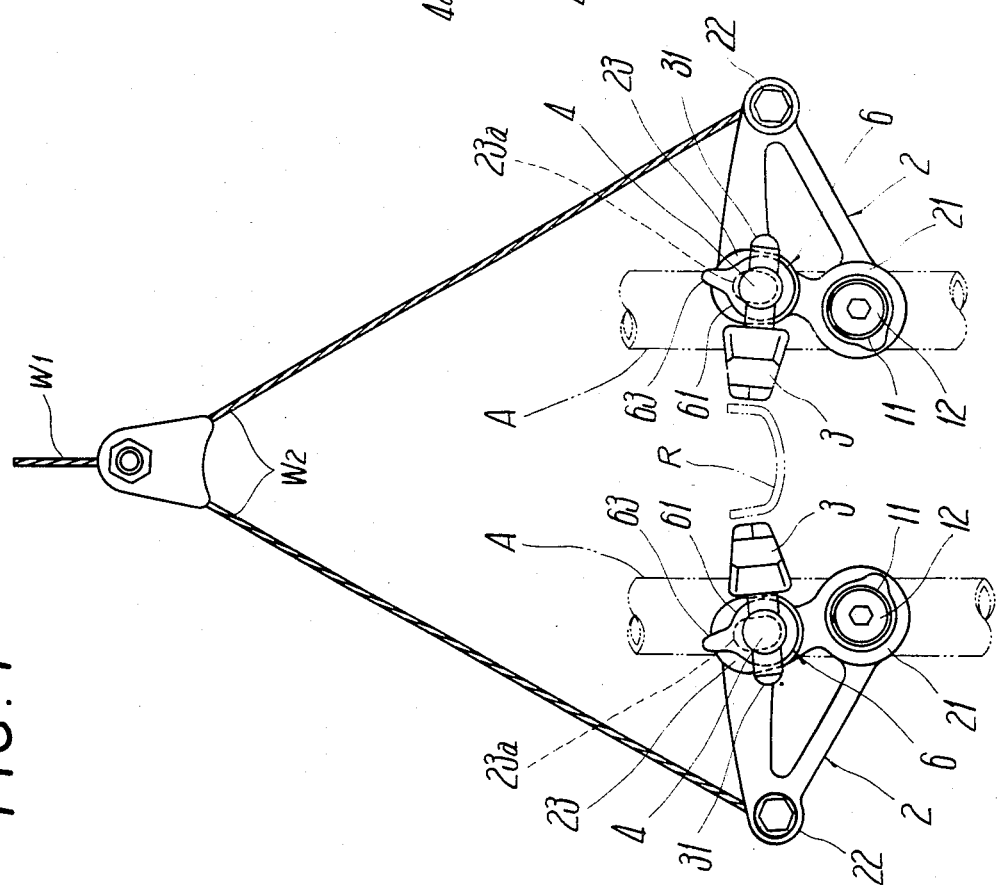
FIG. 1 is a front view of an embodiment of a brake of the invention.

FIG. 1 shows a typical embodiment of a brake of the invention, in which reference numeral 1 designates a pair of bases fixed mainly by means of welding to the bicycle frame A, with the bases 1 having projecting therefrom tubular lever shafts 1a each having a threaded inner bore. Levers 1a swingably support cantilevers 2 respectively.

Each cantilever 2, as shown in FIG. 1, is substantially triangular in shape and has at one corner a pivot portion 21 pivotally supporting the lever shaft 1a, at another corner a support portion 22 disposed outwardly from the frame A and fixing the terminal of a center wire $W_2$ connecting to a control wire $W_1$, and at the other corner a mounting portion 23 for a shoe 3. In other words, mounting portion 23 supports a fixing bolt 4 for fixing the shoe 3. Each cantilever 2 includes a sleeve located at the pivot portion 21 supported on the projecting end of lever shaft 1a. Tightening bolt 12 screws with the inner screw thread of lever shaft 1a through a washer 11. In this manner, cantilever 2 is mounted swingably to the lever shaft 1a. A return spring 13 is interposed between the pivot portion 21 and the root of lever shaft 1a to bias the shoe 3 in the direction of moving away from the wheel rim R, the mounting portion 23 providing a through bore 23a through which the fixing bolt 4 extends axially of lever shaft 1a.

The fixing bolt 4 has a head 4a provided with a mounting bore 41 through which a mounting pin 31 for shoe 3 perforates perpendicularly with respect to the axis of lever shaft 1a. Mounting pin 31 is inserted into the mounting bore 41 while keeping the shoe 3 directed to the wheel rim R. Bolt 4 is inserted into a through bore 23a at the mounting portion 23 while keeping its threaded end directed to the frame A. Nut 5 is screwed with the threaded end of bolt 4, thereby fixing the mounting pin 31 to the cantilever 2.

Figure 2:
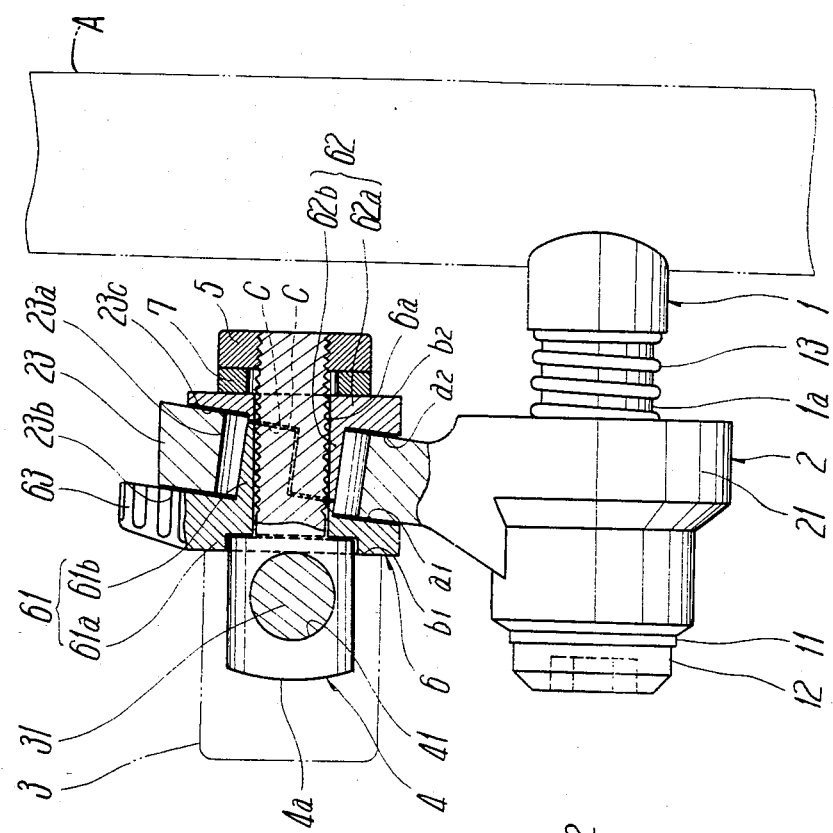
FIG. 2 is a partially cutaway sectional view of the brake shown in FIG. 1.

The aforesaid construction is well-known and the invention provides an adjusting means as shown in FIG. 2 for this construction.

The adjusting means serves to adjust the brake shoe 3 in position with respect to the rim R and is so constructed that an adjusting member or mechanism 6 is formed which has a pair of inner surfaces $a_1$ and $a_2$ parallel to both the outer surfaces 23b and 23c of mounting portion 23 of cantilever 2 and a pair of outer surfaces $b_1$ and $b_2$ inclined relative to the outer surfaces 23b and 23c, with the outer surfaces $b_1$ and $b_2$ being parallel to each other. Inner surface $a_1$ and outer surface $b_1$ corresponding thereto are disposed between one outer surface of mounting portion 23 and the mounting pin 31 for the shoe 3, and the inner surface $a_2$ and outer surface $b_2$ corresponding thereto are disposed between the other outer surface of mounting portion 23 and the nut 5. Also, the adjusting member 6 is provided with an insertion bore 6a for the fixing bolt 4. Bore 6a extends perpendicularly to the outer surface of adjusting member 6, thereby being rotatable with respect to the cantilever 2 around the through bore 6a.

The mounting portion 23 of cantilever 2, as shown in FIGS. 1 and 2, is flat-plate-like-shaped, with the through bore 23a being elongated radially of wheel rim R. Elastic member 7 is interposed between the nut 5 and the adjusting member 6. Also, the adjusting member 6 comprises first and second members 61 and 62 comprising disc-like heads 61a and 62a and cylinders 61b and 62b projecting from a side surface of heads 61a and 62a respectively so that the cylinders 61b and 62b are provided at their utmost ends with engaging portions C abutting against and engaging with each other in a dovetail manner. The inner surfaces $a_1$ and $a_2$ of adjusting member 6 are made flat to sandwich the outer surfaces 23b and 23c of mounting portion 23 in close contact with the inner surfaces $a_1$ and $a_2$, and the heads 61a and 62a are provided with the flat outer surfaces $b_1$ and $b_2$ slanted with respect to the outer surfaces 23b and 23c. Through bore 6a is perpendicular to the outer surfaces $b_1$ and $b_2$.

In addition, a control 63 is formed at the adjusting member 6.

Figure 3:
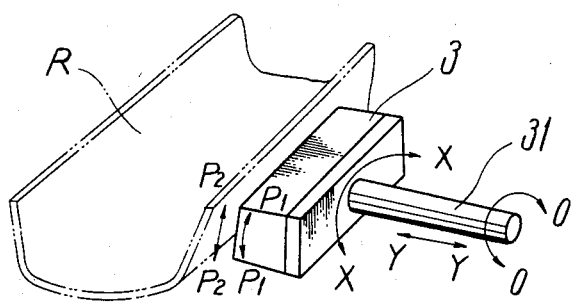
FIG. 3 is an illustration of adjusting direction.

The brake of the invention constructed as foregoing is used in such a manner that a pair of cantilevers 2, as shown in FIGS. 1 and 2, are mounted in predetermined positions on bicycle frame members A by means of bases 1 respectively. Thus, if shoe 3 is not in proper position with respect to the rim R, the nut 5 can be loosened to allow mounting pin 31 to move axially thereof or to be rotated, or to allow the fixing bolt 4 to be rotated, whereby the shoe 3 is adjustable toward or away from the rim R linearly in the direction of the arrows Y—Y, in circle O—O, and vertically in circular arc $P_1$—$P_1$, as shown in FIG. 3. Such adjustment is the same as the conventional technique. In addition, the adjusting member 6 and bolt 4 are adjustable vertically linearly, i.e., with respect to mounting portion 23 in the direction of the arrows $P_2$—$P_2$ (shown in FIG. 3) through the vertically elongate bore 23a which, as shown in FIG. 2, is larger than the throat dmensions of adjusting member 6 so that member 6 can move within bore 23a. Moreover, the adjusting member 6 can be rotated to change a mounting angle of mounting pin 31, thereby enabling adjustment of shoe 3 in the circular arc shown by the arrows X—X as shown in FIG. 3.

When it is desired to change the mounting angle of the mounting pin 31 by rotating the adjusting member 6, the adjusting member 6 and cantilever 2, and also adjusting member 6 and elastic member 7 and nut 5, maintain their same mutual contact relation and the contact portions between these parts can be made contactable in the plane, i.e., their respective mutual contact surfaces remain planar. Hence, the brake as a whole is small, the parts are easy to machine, the contact area therebetween is made larger, and the nut 5 can be fully tightened.

Since the first and second members 61 and 62 at the adjusting member 6 are parallel at the outer surfaces $b_1$ and $b_2$ to each other, the nut 5 can be loosened slightly to simplify the positional adjustment of shoe 3.

During the abovementioned adjustment, despite loosening of nut 5, the elastic member 7 allows the cantilever 2, position adjusting member 6, nut 5, fixing bolt 4 and mounting pin 31, to be strictly coupled without shifting relative to each other.

Figure 4:
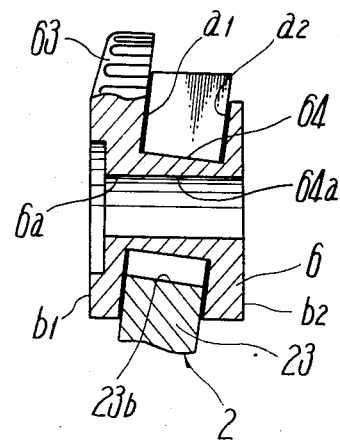
FIGS. 4 and 5 are sectional views exemplary of an adjusting member.
Figure 5:
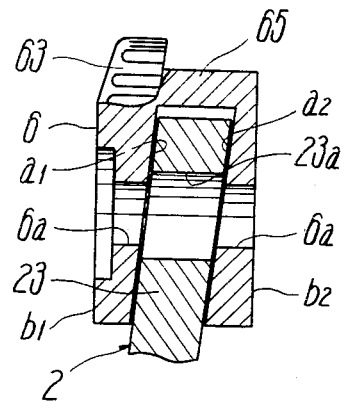

Alternatively, the adjusting member 6 may be formed in one integral piece as shown in FIGS. 4 and 5.

Referring to FIG. 4, the adjusting member is integral through a cylinder 64 which is perpendicular to the pair of inner surfaces $a_1$ and $a_2$ and connects inner surfaces $a_1$ and $a_2$ to each other. Center bore 64a of cylinder 64 coincides with the insertion bore 6a for the bolt 4.

Also, in this case, the through bore 23a at the shoe mounting portion 23 at the cantilever 2 is open outwardly therefrom to thereby enable the shoe 3 via bolt 4 and adjusting means 6 to be mounted on the mounting portion from the exterior, the through bore 23a preferably being enlarged radially of wheel rim R. The manner by which through bore 23a opens outwardly can be accomplished in various ways well within the ambit of one of ordinary skill in the art, e.g., by providing a slot in a side of mounting portion 23 having a slightly larger size than the throat of adjusting member 6 so that member 6 can slide through the slot into through 23a.

Referring to FIG. 5, the adjusting member 6 is integral through a connecting member 65 providing a connection between a pair of inner surfaces $a_1$ and $a_2$ from the outside of mounting portion 23.

Thus, the integral adjusting member 6 enables savings on the total number of required parts and permits easy assembly. In addition, the through bore 23a need not necessarily be enlarged radially of wheel rim R.

Alternatively, the elastic member in the aforesaid embodiment is not indispensable.

In an embodiment where the cantilever 2 is supported swingably to the lever shaft 1a through the tightening bolt 12, the lever shaft 1a is made larger in axial length than the shaft bore at the pivot portion 21 of cantilever 2 so that the bolt 12 is received by the end of lever shaft 1a in a manner which does not affect rotation of the cantilever 2, thereby enabling smooth rotation thereof.

Figure 6:
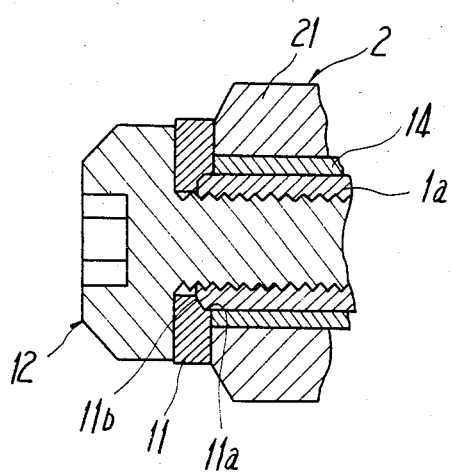
FIG. 6 is an enlarged sectional view of a support portion only which supports a cantilever to a lever shaft.

In this same embodiment, the shaft end receiving the bolt 12 may be plastically-deformed by the tightening force thereof, thereby creating a problem in that the cantilever is difficult to mount or dismount for its reworking or replacement. Accordingly, in order to solve this problem, the washer 11, as shown in FIG. 6, is provided with a recess 11a to which the end of lever shaft 1a is fitted and with a socket 11b extending radially inwardly to receive the end of lever shaft 1a, thereby holding the end of lever shaft 1a by the recess 11a.

Figure 7:
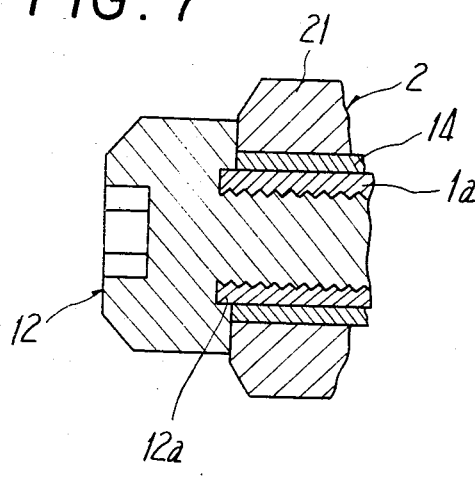
FIG. 7 is an enlarged sectional view of a modified embodiment of the invention corresponding to FIG. 6.

In an embodiment wherein no washer 11 is used, the aforesaid problem can be solved by providing at the head of bolt 12 an annular groove 12a. In addition, in FIGS. 6 and 7, reference numeral 14 designates a bush.

As seen from the above, the cantilever brake of the invention uses the adjusting member 6 to adjust the shoe 3 in position with respect to the wheel rim R, whereby there is no need to make the contact surfaces of cantilever 2 and nut 5 spherical. Hence, the planar contact surfaces facilitate machining of parts, whereby the brake of the invention is inexpensive to produce to that extent and it is clear that sufficient tightening function is provided by nut 5 which is small-sized and that a very wide range of position adjustment is achievable.

Although several embodiments have been described, they are merely exemplary of the invention and not to be construed as limiting, the invention being defined solely by the appended claims.

What is claimed is:

1. A brake for a bicycle comprising a pair of bases, each base being fixed to a frame of said bicycle and having a lever shaft; a pair of arms, each supported swingably to a said lever shaft at a said base and each having a pivot portion and a shoe mounting portion; a pair of brake shoes, each brake shoe being fixed to a said shoe mounting portion and having a mounting pin; a pair of fixing bolts, each bolt fixing a said mounting pin to a said arm and each bolt having a head, and a pair of nuts, each nut screwing with a said bolt, so that said brake shoes can be brought into contact with a wheel rim of the bicycle to thereby exert a braking action on said rim; and adjusting means for adjusting positions of said brake shoes with respect to said wheel rim, said adjusting means including a pair of adjusting mechanisms, each adjusting mechanism having a pair of inner surfaces substantially parallel to outside surfaces of a said shoe mounting portion and a pair of outer surfaces inclined with respect to said outside surfaces, said outer surfaces being parallel to each other, each said adjusting mechanism further having an insertion bore for a said bolt, said insertion bore being substantially perpendicular to said outer surfaces, said adjusting mechanisms each being supported rotatably with respect to a said arm, each said adjusting mechanism comprising a pair of first and second members, each first and second member having a said inner surface and a said outer surface, at least one of said first and second members having a cylindrical portion projecting substantially perpendicularly to said inner surfaces of each of said first and second members, a center bore of said cylindrical portion being in continuation of and coinciding with a said insertion bore for a said bolt which is substantially perpendicular to said outer surfaces of each of said first and second members.

2. A brake according to claim 1, wherein said first and second members each have a said cylindrical portion, each cylindrical portion having an engaging portion engageable with and rotatable integrally with an engaging portion of a corresponding said first and second member.

3. A brake for a bicycle comprising a pair of bases, each base being fixed to a frame of said bicycle and having a lever shaft; a pair of arms, each supported swingably to a said lever shaft at a said base and each having a pivot portion and a shoe mounting portion; a pair of brake shoes, each brake shoe being fixed to a said shoe mounting portion and having a mounting pin; a pair of fixing bolts, each bolt fixing a said mounting pin to a said arm and each bolt having a head, and a pair of nuts, each nut screwing with a said bolt, so that said brake shoes can be brought into contact with a wheel rim of the bicycle to thereby exert a braking action on said rim; and adjusting means for adjusting positions of said brake shoes with respect to said wheel rim, said adjusting means including a pair of adjusting mechanisms, each adjusting mechanism having a pair of inner surfaces substantially parallel to outside surfaces of a said shoe mounting portion and a pair of outer surfaces inclined with respect to said outside surfaces, said outer surfaces being parallel to each other, each said adjusting mechanism further having an insertion bore for a said bolt, said insertion bore being substantially perpendicular to said outer surfaces, said adjusting mechanisms each being supported rotatably with respect to a said arm, said inner surfaces of each said pair of inner surfaces of a said adjusting mechanism being connected at a central portion thereof by a cylindrical portion, each said cylindrical portion comprising a said insertion bore for a said bolt, which insertion bore is substantially perpendicular with respect to said outer surfaces of a said adjusting mechanism.

4. A brake according to claim 3, wherein each said insertion bore is open outwardly with respect to a said shoe mounting portion.

5. A brake for a bicycle comprising:
(a) a base fixed to a frame of said bicycle, said base having a lever shaft;
(b) an arm supported swingably to said lever shaft at said base and having a pivot portion and a shoe mounting portion;
(c) a brake shoe fixed to said shoe mounting portion and having a mounting pin projecting therefrom, said brake shoe for contacting a wheel rim of said bicycle to thereby exert a braking action on said rim;
(d) a fixing bolt attached to said mounting pin and extending through a through bore in said mounting portion, said bolt for fixing said mounting pin to said arm, said bolt having a head portion;
(e) a nut threadedly attached to said bolt for securing said bolt to said mounting portion;
(f) adjusting means for adjusting positions of said brake shoe with respect to said wheel rim, said adjusting means including an adjusting mechanism having a pair of inner surfaces parallel to outside surfaces of said shoe mounting portion and a pair of outer surfaces inclined with respect to said outside surfaces, said pair of outer surfaces being parallel to each other, said adjusting mechanism further comprising an insertion bore through which said bolt extends, said adjusting mechanism being at least partially disposed in said through bore, said insertion bore being at least partially disposed within said through bore and being substantially perpendicular to said outer surfaces, said adjusting mechanism being supported rotatably with respect to said arm, said adjusting mechanism comprising a pair of first and second members each having a said inner surface and a said outer surface, at least one of said first and second members having a cylindrical portion projecting substantially perpendicularly with respect to said inner surfaces of each of said first and second members, said insertion bore for said bolt being in continuation of and coincident with a center bore in said cylindrical portion, said center bores being substantially perpendicular to said outer surfaces of each of said first and second members.

6. A brake according to claim 5, wherein said first and second member each have a said cylindrical portion, each cylindrical portion including an engaging portion, said engaging portions being engageable with and rotatable integrally with each other.

7. A brake for a bicycle comprising:
(a) a base fixed to a frame of said bicycle, said base having a lever shaft;
(b) an arm supported swingably to said lever shaft at said base and having a pivot portion and a shoe mounting portion;
(c) a brake shoe fixed to said shoe mounting portion and having a mounting pin projecting therefrom, said brake shoe for contacting a wheel rim of said bicycle to thereby exert a braking action on said rim;
(d) a fixing bolt attached to said mounting pin and extending through a through bore in said mounting portion, said bolt for fixing said mounting pin to said arm, said bolt having a head portion;
(e) a nut threadedly attached to said bolt for securing said bolt to said mounting portion;
(f) adjusting means for adjusting positions of said brake shoe with respect to said wheel rim, said adjusting means including an adjusting mechanism having a pair of inner surfaces parallel to outside surfaces of said shoe mounting portion and a pair of outer surfaces inclined with respect to said outside surfaces, said pair of outer surfaces being parallel to each other, said adjusting mechanism further comprising an insertion bore through which said bolt extends, said adjusting mechanism being at least partially disposed in said through bore, said insertion bore being at least partially disposed within said through bore and being substantially perpendicular to said outer surfaces, said adjusting mechanism being supported rotatably with respect to said arm, said inner surfaces of said adjusting mechanism being connected at a central portion thereof by a cylindrical portion, said cylindrical portion comprising said insertion bore for said bolt, which insertion bore is substantially perpendicular with respect to said outer surfaces of said adjusting mechanism.

8. A brake according to claim 7, wherein said through bore is open outwardly with respect to said shoe mounting portion.

* * * * *